Feb. 12, 1963 D. L. KENAGA 3,077,418
STABILIZATION OF WOOD AND WOOD PRODUCTS WITH STYRENE
ACRYLONITRILE, BIS(2-CHLOROETHYL)VINYL PHOSPHONATE
Filed Feb. 5, 1958

INVENTOR.
Duane L. Kenaga
BY
ATTORNEY 3,077,418
STABILIZATION OF WOOD AND WOOD PRODUCTS WITH STYRENE ACRYLONITRILE, BIS(2-CHLOROETHYL)VINYL PHOSPHONATE
Duane L. Kenaga, Midland, Mich., assignor to The Dow Chemical Company, Midland, Mich., a corporation of Delaware
Filed Feb. 5, 1958, Ser. No. 713,288
7 Claims. (Cl. 117—59)

This invention relates to stabilization of wood and natural and artifically formed lignocellulose-containing materials and more particularly to a new and useful method for the stabilization of wood and wood-like products against dimensional change and to compositions for effecting such stabilization.

It is well known that materials made up entirely or predominantly of cellulose fibers expand and contract with variations in humidity in the ambient atmosphere. In wood, for example, such swelling and shrinking is accompanied by warping and checking. These properties are particularly undesirable when wood is used as a structural material. Wood undergoes an increase in dimension upon absorption of moisture from the atmosphere and a contraction when moisture is given up to the atmosphere. In a very humid atmosphere swelling continues until a moisture content of between 28 and 30 percent is reached. This moisture content is known as the "fiber-saturation point." Below the fiber-saturation point the water enters the fine capillary structure of the cell walls and affects the dimensions of the wood. Above this moisture content the water enters the cell cavities or the coarse capillary structure. The water present in the coarse capillary structure of the wood is called "free water" and does not affect the swelling and shrinking under normal conditions.

Stabilization of wood against dimensional changes has been attempted heretofore with only limited success. Some of the more important general methods which have been employed are (1) coatings, both external and internal; (2) deposition of bulking agents in the cell walls; (3) decreased hygroscopicity plus bulking; and, (4) chemically cross-linking the cellulose molecules, thereby reducing the degree to which wood can swell. An example of the cross-linking method of dimensional stabilization is the treatment of wood with formaldehyde. The stabilization is obtained by a reaction between formaldehyde and the hydroxyl groups of the cellulose molecules connecting together the latter by cross-bridges of acetal linkages. One of the principal disadvantages of the formaldehyde treatment is that it requires anhydrous conditions and very corrosive mineral acids as catalysts, resulting in extensive hydrolytic degradation of the wood. An example of the bulking technique for the stabilization of wood is the impregnation of the swollen wood with a thermosetting resin. In this method, an unpolymerized resin is permitted to diffuse into the cell walls and the treated wood heated to polymerize the resin within the cell walls to form an irreversible polymerized compound which holds the wood in a swollen state. This treatment, however, changes the physical properties of wood, notably its resiliency and shock resistance. Furthermore, resin treated wood is very heavy and very hard. The resin process has other disadvantages from the treatment standpoint in that it is only commercially practicable for veneer or plywood. A more recent theory under which wood is stabilized is by reduction of hygroscopicity plus bulking. The theoretical principle is thought to be a replacement of some of the hydroxyl groups of the cellulose structure by reaction with the treating material plus bulking the cell walls by the specific volume of the treating material. An example of this technique is acetylation with acetic anhydride and catalysts and swelling agents such as pyridine or dimethylformamide. This procedure is not commercially practical for large cross section treatment.

It is, therefore, an object of this invention to provide a new and novel method for the dimensional stabilization of wood and other lignocellulosic materials. A further object is to provide a method for reducing the shrinkage and swelling of wood. A still further object is to provide wood resistant to warping and checking. A still further object is to provide a dimensionally stabilized wood which when stabilized is free of the degradation caused by using known cross-linking agents and catalysts. These and other objects will become evident from the following specification and claims.

Figure 1:
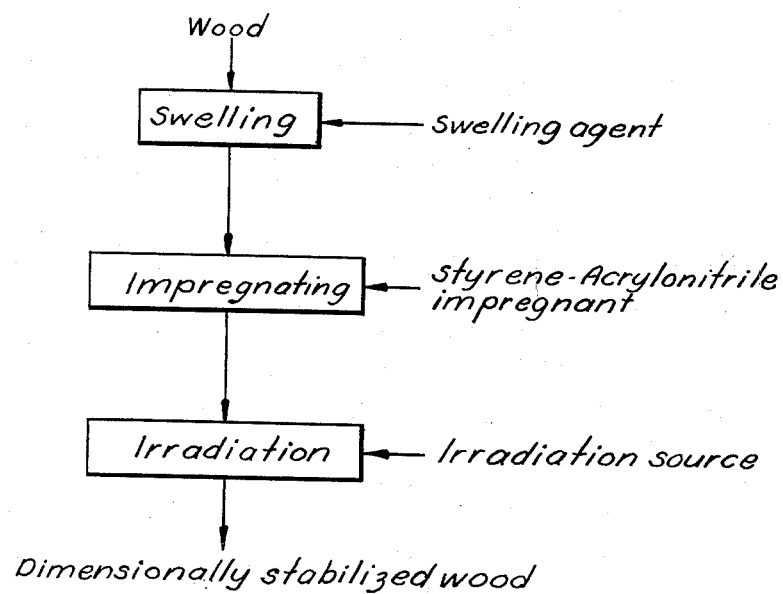
FIGURE 1 represents a schematic flow diagram of the process described hereinafter for treating lignocellulosic materials with a styrene, acrylonitrile, and/or bis(2-chloroethyl)vinyl phosphonate impregnant.
Figure 2:
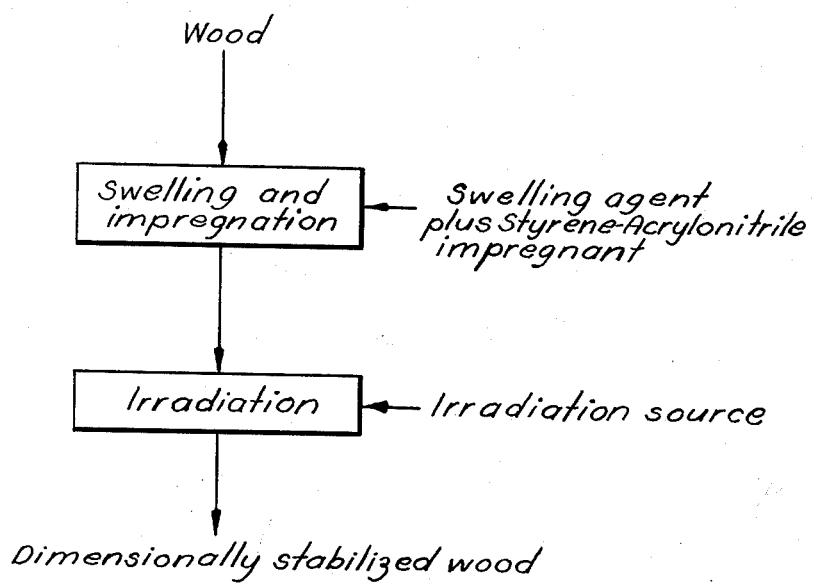
FIGURE 2 is a schematic diagram of an alternative method for treating lignocellulosic materials in accordance with the present invention to accomplish dimensional stabilization of the material.

In accordance with the present invention, it has been found that effective dimensional stabilization of any wood or other lignocellulosic material can be obtained by treatment thereof with a non-leachable, non-swellable, insolubilizable compound having radiation-activatable reactive groups and irradiating the so treated wood under conditions whereby a significant proportion of the treating compound is retained in the wood. The resulting wood product, containing from 10 to 50 percent, or more, by weight, of the compound in the form of a non-leachable, non-swellable water insoluble product associated with the wood, is found to be stabilized against dimensional changes, warping and checking resulting from effects of moisture. Although the amount of compound desirable in the wood structure will vary with the intended use of the stabilized material, the presence of 15 to 30 percent by weight of the compound is considered preferable for most purposes.

By employing the treatment of the present invention, wood may be dimensionally stabilized or made resistant to swelling and shrinking without altering greatly its physical properties. Furthermore, anhydrous conditions are not required in carrying out this process. The present treating compounds may be introduced into the wood from substantially any wood-swelling solvent, such as aqueous or organic solvent solutions. The subsequent irradiation provides a degree of stabilization or reduction in swelling of from about 10 to 70 percent or more. The percent reduction in swelling depends in part on the weight of the compounds retained by the wood. The process of the present invention is applicable to commercial application where relatively large cross-sections are to be stabilized.

In accordance with this invention, wood is immersed in the impregnate or in the impregnating compound dissolved or dispersed in a wood swelling agent to assist in the penetration of the former into the cell wall and into intimate contact with the cellulosic structure. Alternatively, the wood may be swelled with a wood-swelling agent and then immersed in the impregnant or a solution of the impregnant. This immersion or impregnation step may be conducted at atmospheric pressure or at sub- or super-atmospheric pressure, and at room temperature or slightly elevated temperatures. Such impregnation methods are well known to those versed in the art of wood preservation. It is generally preferred to operate at a temperature range of about from 15° to 85° C. Such temperatures give good results, although somewhat higher and lower temperatures may be employed without materially affecting the results. The treating compound may be applied from aqueous solution, but solutions in organic solvents may also be employed with equal success when good recovery permits reuse of the solvents. In some cases the treating compound may also serve as the swelling agent or solvent. Suitable organic solvents include those which swell wood such as methanol, ethylene glycol, methyl ether, N-methylpyrrolidone, dioxanes, dimethylformamide, diethylene glycol, diethylene glycol methyl ether, pyridine, n-butylamine, piperidine, morpholine, 4-picoline, 2-picoline, diethylamine, aniline, acetone, and mixtures thereof, or aqueous solutions or aqueous mixtures thereof.

Various impregnating compounds have been found satisfactory. Some of such compounds are the styrene-acrylonitrile mixtures and styrene-acrylonitrile-bis(2-chloroethyl)vinyl phosphonate mixtures.

The concentration of impregnating or treating solution will depend in part on the specific treating compound, the solvent, the temperature, and the type of irradiation. Generally, a 15–30 percent solution has been found to be convenient, although any suitable concentration may be employed.

The preferred conditions for treatment will depend on the particular wood or wood product, the dimensions thereof, the treating compound, the type and degree of irradiation, the solvent, and, in some instances other factors. After an immersion period in the treating solution, the impregnated wood is "cured" by exposure to ionizing radiation for a suitable period of time to bring about a reaction, bonding or other association between the treating compound and the cellulosic material so that a significant proportion of the treating compound is retained within the wood (lignocellulosic) structure. In selecting a suitable radiation source, high-energy particulate radiation or high-energy electromagnetic radiation may be employed. Thus, one may employ atomic particles, neutrons, photons, gamma rays, X-rays, electrons, deuterons, and fission fragments from nuclear reactors or accelerators, or from artificial or natural radioactive isotopes. Good results have been obtained by irradiation from sources emitting from $10^2$ to $10^7$ rads./sec. such as a 2 mev. (million electron volts) source at beam currents up to 145 microamps. Good results have also been obtained by irradiation from a cobalt 60 source at dose rates up to 650,000 rads./hr. (698,750 reps./hr.). Wood or wood products may be irradiated up to a dose of $10^7$ rads. Irradiation at doses greater than $10^7$ rads. will probably cause severe degradation of the cellulosic structure.

After the curing step, the unassociated treating agent and swelling agent may be removed from the wood. The result of this series of operations is that a significant residue of the stabilizing compound is reacted with or in some manner associated with and retained in the wood structure, imparting thereto the property of resistance to dimensional change resulting from variations in ambient humidity.

In one procedure for treating wood to obtain dimensional stabilization, an air-dried ponderosa pine sapwood block, for example, is weighed, and accurately measured in the tangential direction. The wood is then impregnated with one of the treating compounds by vacuum impregnation at an appropriate temperature and pressure. In many instances the impregnate is a solution of the compound dissolved or dispersed in a wood-swelling agent, such as dimethylformamide. Subsequently, the block is removed from the solution and may be sealed in a water- and air-impervious, plastic material to prevent loss of treating solution. The so packaged wood is irradiated to from $10^2$ to $10^7$ rads. by, for example, a 2 million-volt-electron beam (Van de Graaff generator) with a current of from 5.6 to 56 microamps. with the wood in the electron beam about 20 percent of the time. In other instances, the impregnated wood is irradiated in a cobalt 60 source at a dose rate of about 156,000 rads. per hour. Following the irradiation, the wood, if sealed in the plastic bag, is removed from the bag and conditioned in air to remove unreacted volatile solvents and/or unreacted or solvent soluble compounds, and in laboratory comparison techniques leached with running distilled water until the pH of the leached water is the same as that of the untreated concurrently leached controls to remove any unassociated compound or water soluble solvents.

For the purposes of comparison and to determine the degree of dimension stability, the leached wood pieces are oven dried at 100–105° C., measured along the tangential direction, re-weighed, soaked in water, and re-measured. From the difference in the dried weights before and after treatment with the compounds, the percent compound in the treated wood can be determined. From the difference in tangential dimensions of the treated soaked wood and the treated oven-dried wood, the percent swelling of the treated wood can be determined. Similar measurements are made on controls of untreated wood. From the data, the degree of dimensional stabilization or reduction in swelling can be calculated according to the following equation:

Percent reduction in swelling $$= \frac{\text{(Percent swelling of untreated wood)} - \text{(Percent swelling of treated wood)}}{\text{Percent swelling of untreated wood}}$$

The following examples are illustrative of the present invention but are not to be construed as limiting the same.

Example 1

Clear ponderosa pine sapwood wafers or blocks measuring 1.375 inches radially x 2 inches tangentially x 0.25 inch longitudinally were weighed and accurately measured along the tangential direction. Certain of these wafers were immersed in dimethylformamide containing 20 percent of a 50–50 molal mixture of styrene and acrylonitrile by subjecting the wood blocks first to a vacuum of 10 mm. of mercury for ten minutes and then introducing into the evacuated chamber the treating solution. During this operation the pressure was restored to atmospheric pressure. The blocks were held immersed for about 10 minutes and then the wafers were packaged in small plastic polyethylene bags to prevent loss of treating solutions. The so packaged wafers and untreated checks were subjected to electron irradiation from a Van de Graaff electrostatic generator. Following the irradiation, the wafers were removed from the polyethylene bags, conditioned to remove any unreacted volatile solvents, monomers, or compounds and then leached in running distilled water for three days. The blocks were then carefully dried to below fiber saturation point to prevent checking and then oven-dried at 105° C. for 24 hours. The wafers were then measured and weighed at the oven-dried conditions to determine retention and the tangential dimensions, and then were re-swelled in water to obtain the swollen dimensions.

The results of measurements taken before and after treatment compared to the controls are recorded below as percent reduction in swelling.

| Dose in Rads | Percent Reduction in Swelling | Percent Weight Increase |
|---|---|---|
| $0.93 \times 10^{6.5}$ | 32.2 | 16.6 |
| $0.93 \times 10^7$ | 35.8 | 27.1 |

Example 2

In a like manner as above, employing dimethylformamide containing 20 percent by weight of a mixture of styrene, acrylonitrile and bis(2-chloroethyl)vinyl phosphonate in mole ratios of 1:1:1; 2:2:1; 4:4:1 and 1:1:0, respectively, the following results were obtained:

| Dose, Rads | Ratio | Percent Reduction in Swelling | Percent Weight Increase |
|---|---|---|---|
| $0.93 \times 10^7$ | 1:1:1 | 29.2 | 9.5 |
| $0.93 \times 10^7$ | 2:2:1 | 24.6 | 10.0 |
| $0.93 \times 10^7$ | 4:4:1 | 27.8 | 16.8 |
| $0.93 \times 10^7$ | 1:1:0 | 33.1 | 26.8 |

What is claimed is:

1. A process for the dimensional stabilization of lignocellulosic materials which comprises the steps of swelling the said lignocellulosic material with an organic swelling agent, while simultaneously impregnating the said so swelled material with a mixture of styrene, acrylonitrile and bis(2-chloroethyl)vinyl phosphonate, consisting of a mixture of about one mole of acrylonitrile and about zero to one mole of phosphonate per mole of styrene, and irradiating the so treated wood with from $10^2$ to $10^7$ rads of high energy radiation for from 1 sec. to 24 hours.

2. A process for the dimensional stabilization of lignocellulosic materials as set forth in claim 1 wherein the molar ratio of impregnate components is 1:1:0 respectively.

3. A process for the dimensional stabilization of lignocellulosic materials as set forth in claim 1 wherein said impregnate components are mixed in a molar ratio of 1:1:½ respectively.

4. A process for the dimensional stabilization of lignocellulosic materials as set forth in claim 1 wherein said impregnate components are mixed in a molar ratio of 1:1:¼ respectively.

5. A process for the dimensional stabilization of lignocellulosic material which comprises the steps of swelling the said lignocellulosic material with an organic swelling agent, impregnating the said material with a mixture of styrene, acrylonitrile and bis(2-chloroethyl)vinyl phosphonate consisting of about one mole of acrylonitrile and about zero to about one mole of phosphonate per mole of styrene respectively, and irradiating the said so treated material with from $10^2$ to $10^7$ rads of high energy particulate radiation for from 1 sec. to 24 hours.

6. A process for the dimensional stabilization of lignocellulosic materials which comprises the steps of swelling the said lignocellulosic material with an organic swelling agent, impregnating the said material with a mixture of styrene, acrylonitrile and (2-chloroethyl)vinyl phosphonate consisting of about one mole of acrylonitrile and about zero to about one mole of phosphonate per mole of styrene respectively, and irradiating the said so treated material with from $10^2$ to $10^7$ rads of high energy magnetic radiation for from 1 sec. to 24 hours.

7. A process for the dimensional stabilization of wood which comprises the steps impregnating the wood with a mixture of styrene, acrylonitrile and bis(2-chloroethyl)-vinyl phosphonate, said compounds being mixed in a ratio consisting of about one mole of acrylonitrile to about zero to one mole of phosphonate per mole of styrene and irradiating the so treated wood with from $10^2$ to $10^7$ rads of high energy radiation for from 1 sec. to 24 hours.

References Cited in the file of this patent

UNITED STATES PATENTS

| | | |
|---|---|---|
| 1,241,738 | Klatte | Oct. 2, 1917 |
| 2,186,360 | Britton | Jan. 9, 1940 |
| 2,352,740 | Shannon | July 4, 1944 |
| 2,636,027 | Coover | Apr. 21, 1953 |
| 2,670,483 | Brophy | Mar. 2, 1954 |
| 2,790,736 | McLaughlin | Apr. 30, 1957 |
| 2,793,970 | Jeppson | May 28, 1957 |

OTHER REFERENCES

BNL 389 (T-73), "Progress Report on Fission Products Utilization VII," Brookhaven National Lab., May 1946, especially page 19.

Sun: "Modern Plastics," vol. 32, No. 1, September 1954, pp. 141–144, 146–148, 150, 229–233 and 236–238.